US008027043B2

(12) United States Patent
Thomas et al.

(10) Patent No.: US 8,027,043 B2
(45) Date of Patent: Sep. 27, 2011

(54) METHOD AND SYSTEM FOR INVENTORY CONTROL OF SECURE STOCK IN FEEDERS AND FINISHERS

(75) Inventors: Timothy D. Thomas, Fairport, NY (US); Michael Marchetti, Victor, NY (US); Russell J. Powers, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 796 days.

(21) Appl. No.: 12/111,590

(22) Filed: Apr. 29, 2008

(65) Prior Publication Data

US 2009/0268233 A1 Oct. 29, 2009

(51) Int. Cl.
*B65H 29/00* (2006.01)
*G06K 15/00* (2006.01)

(52) U.S. Cl. ..................... 358/1.12; 358/1.14; 271/3.09; 271/288

(58) Field of Classification Search .................... 399/19, 399/23; 271/263, 3.01, 3.09, 3.14, 8.1, 288; 358/1.15, 1.12, 1.14, 1.18
See application file for complete search history.

(56) References Cited

U.S. PATENT DOCUMENTS

| | | | | |
|---|---|---|---|---|
| 5,961,115 | A * | 10/1999 | Blanck et al. | 271/263 |
| 6,449,440 | B1 * | 9/2002 | Sawada | 399/19 |
| 6,621,919 | B2 * | 9/2003 | Mennie et al. | 382/135 |
| 2002/0051192 | A1 * | 5/2002 | Utsunomiya | 358/1.15 |
| 2003/0029875 | A1 * | 2/2003 | Sesek | 220/589 |
| 2003/0091351 | A1 * | 5/2003 | Weaver et al. | 399/23 |
| 2003/0102618 | A1 * | 6/2003 | Sesek | 270/58.08 |
| 2003/0118228 | A1 * | 6/2003 | Mennie et al. | 382/135 |
| 2004/0135838 | A1 * | 7/2004 | Owen et al. | 347/19 |
| 2007/0168257 | A1 * | 7/2007 | Sakuma et al. | 705/22 |

* cited by examiner

*Primary Examiner* — Jerome Grant, II
(74) *Attorney, Agent, or Firm* — Gibb I.P. Law Firm, LLC

(57) ABSTRACT

A method and system for auditing security stock usage including displaying one or more data on a graphical user interface (GUI); extracting a first set of information into a first log file from the one or more data displayed on the GUI; commencing a print run on a printer; extracting a second set of information into a second log file after the print run terminates; and determining a number of sheets of security stock used from the first log file and the second log file.

18 Claims, 3 Drawing Sheets

| Module | Tray | Count | Read Date | Count Since Last Save |
|---|---|---|---|---|
| Feeder 2 | 1 | 547560 | 10-31-07 09:29:08 AM | 0 |
| Feeder 2 | 2 | 668500 | 10-31-07 09:29:08 AM | 0 |
| Feeder 2 | 3 | 65330 | 10-31-07 09:29:08 AM | 0 |
| Feeder 2 | 4 | 224311 | 10-31-07 09:29:08 AM | 0 |
| Feeder 1 | 1 | 27681 | 10-31-07 09:29:08 AM | 0 |
| Feeder 1 | 2 | 52637 | 10-31-07 09:29:08 AM | 0 |
| Feeder 1 | 3 | 5310 | 10-31-07 09:29:08 AM | 0 |
| Feeder 1 | 4 | 3446 | 10-31-07 09:29:08 AM | 0 |
| Feeder B | Top Tray | 7091 | 10-31-07 09:29:08 AM | 0 |
| Feeder B | Lower ... | 45 | 10-31-07 09:29:08 AM | 0 |
| Feeder B | Upper ... | 1956 | 10-31-07 09:29:08 AM | 0 |

METHOD AND SYSTEM FOR INVENTORY CONTROL OF SECURE STOCK IN FEEDERS AND FINISHERS

TECHNICAL FIELD

The present disclosure relates to digital imaging system architecture, and, more specifically, to a method and system for providing inventory control of secure stock in feeders and finishers.

BACKGROUND

Magnetic Ink Character Recognition or MICR is a character recognition technology adopted mainly by the banking industry to facilitate the processing of checks. The major MICR fonts used around the world are E-13B and CMC-7. Almost all U.S., Canadian, and U.K. checks include MICR characters at the bottom of the paper in the E-13B font. In addition to their unique fonts, MICR characters are printed with a magnetic ink or toner. Magnetic printing is used so that the characters can be reliably read into a system. Thus, the bottom line on a check must always be printed in the MICR typeface using a special magnetic ink, which allows the check information to be automatically read by inexpensive machines.

There are several MICR check printers in the market today that use either pre-printed or blank security check stock. However, such MICR check printers lack certain types of functionality. For example, customers may desire to acquire an accurate count of every sheet of check stock that is fed from each feeder, the number of sheets purged, sent to each finisher, and cleared through jam clearance. Current MICR check printers require a customer to restart the MICR check printer, open a text file containing "boot time" saved on non-volatile memory (NVM) that a customer service engineer (CSE) informed them about, pull out specific NVM values, run their job, restart the system, and compare such data against the same text file over and over again. As a result, this process requires a restart of the MICR check printer for every job desired by the user, and also requires specialized knowledge of an internal file produced by the print station. This is a very cumbersome process to go through in order to obtain an accurate count of every sheet of check stock that is fed from each feeder, the number of sheets purged, sent to each finisher, and cleared through jam clearance.

Consequently, none of the existing MICR check printer manufacturers has presented a desirable solution for obtaining such information quickly and efficiently. Therefore, it would be highly desirable to provide for a method and system for providing inventory control of secure stock in feeders and finishers.

SUMMARY

A method for auditing security stock usage, the method including displaying one or more data on a graphical user interface (GUI); extracting a first set of information into a first log file from the one or more data displayed on the GUI; commencing a print run on a printer; extracting a second set of information into a second log file after the print run terminates; and determining a number of sheets of security stock used from the first log file and the second log file.

A system for auditing security stock usage, the system including a graphical user interface (GUI) for displaying one or more data; a first log file including a first set of information extracted from the one or more data displayed on the GUI; a printer for receiving a print run; a second log file including a second set of information extracted from the one or more data displayed on the GUI after the print run terminates; and a tracking mechanism for determining a number of sheets of security stock used from the first log file and the second log file.

A computer program product for auditing security stock usage, the computer program product including a storage medium readable by a processing circuit and storing instructions for execution by the processing circuit for facilitating a method comprising: displaying one or more data on a graphical user interface (GUI); extracting a first set of information into a first log file from the one or more data displayed on the GUI; commencing a print run on a printer; extracting a second set of information into a second log file after the print run terminates; and determining a number of sheets of security stock used from the first log file and the second log file.

DETAILED DESCRIPTION

The exemplary embodiments of the present disclosure pertain to a method and system for providing inventory control of secure stock in feeders and finishers. Specifically, the exemplary embodiments of the present disclosure pertain to a tool and procedure that can be used by customers to audit the use of secure stock on magnetic ink character recognition (MICR) printers. Customers using security stock typically have a need to manage and account for all sheets of that stock used by a printer. Waste sheets can be generated during the printing process (e.g., as the result of paper jams), and either automatically purged by the system, or manually removed from the paper path by operators. To facilitate auditing of overall stock usage, a graphical user interface (GUI) is presented to the operator that shows the number of sheets fed from each tray, and the number of sheets delivered to each output destination (including purge destinations). These features and aspects will become better understood with regard to the following description of the exemplary embodiments.

Figure 1:
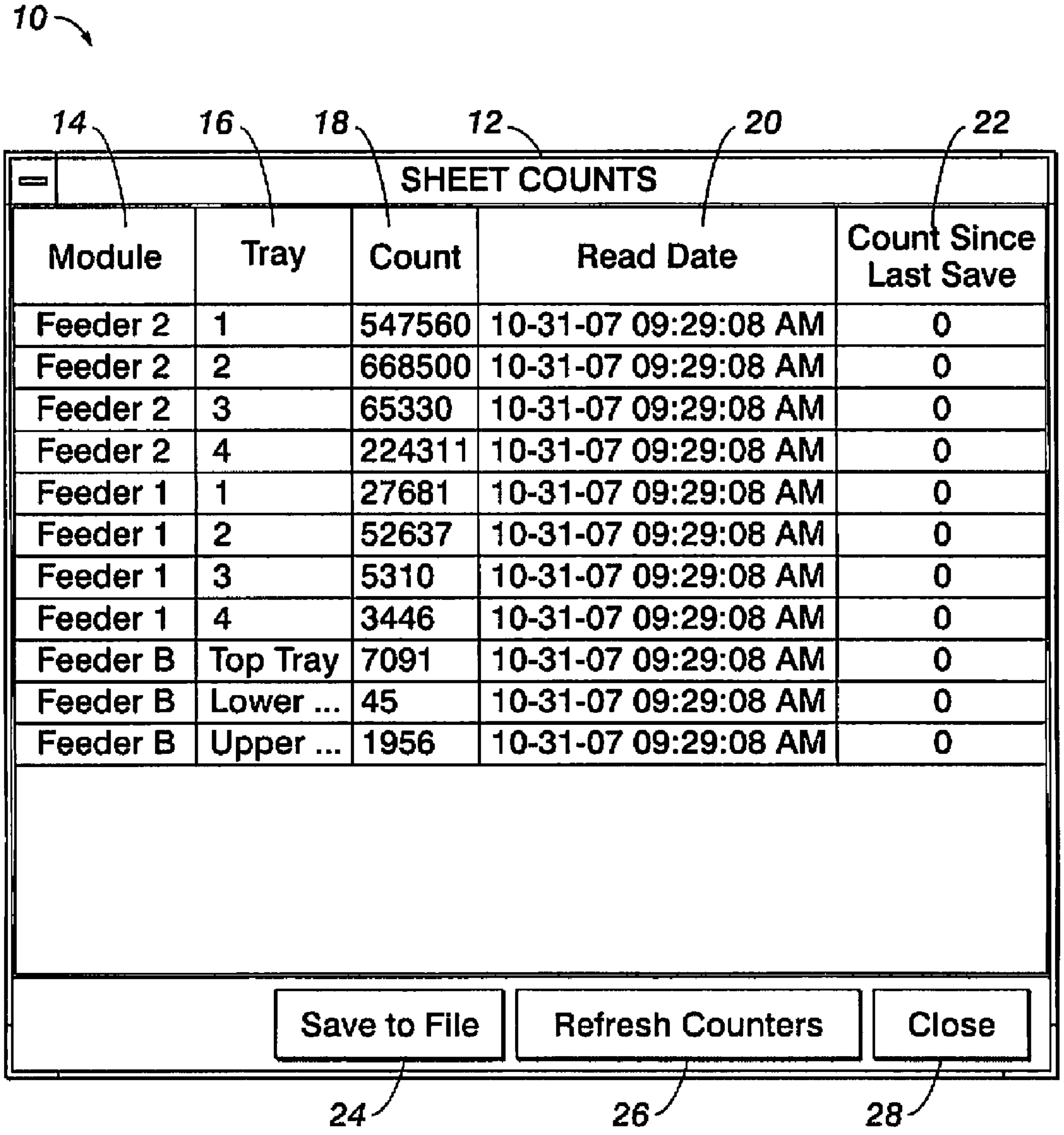
FIG. 1 illustrates a graphical user interface (GUI) depicting a sheet count in an initial state with no system counts, in accordance with the exemplary embodiments of the present disclosure.

FIG. 1 illustrates a GUI depicting a sheet count in an initial state with no system counts, in accordance with the exemplary embodiments of the present disclosure. The GUI 10 includes a sheet counts file path 12, a printer module column 14, a printer tray column 16, a count column 18, a read data column 20, a counts since last save column 22, a save to file button 24, a refresh counters button 26, and a close button 28.

The printer module column 14 includes several feeders (e.g., feeder 1 and feeder 2) and finishers (e.g., finisher B), each of the feeders and finishers including several printer trays (e.g., tray 1, tray 2, top tray, lower tray, and upper tray) located in the printer tray column 16. Each tray in the printer tray column 16 includes a count number located in the count column 18. Each count number in the count column 18 is tracked in the read data column 20. The count since last save column 22 is activated after a print run is commenced by the user of the MICR printer.

In FIG. 1, a user of an MICR printer (not shown) opens the GUI 10 prior to starting a print run and saves the counts located in the count column 18 to a log file. During the print run, the user manually counts any jammed sheets that may be cleared from the paper path, and the system counts sheets delivered to the stacker or purged to the top tray. The operator uses this information, along with manually-captured data on the number of sheets loaded in the trays and the number of sheets manually removed from the paper path during jam clearance, to account for the total number of sheets of the security stock that was used.

At the end of the print run, a second log file is saved and the counts for that job located in the count since last save column 22 are calculated from the data in the two log files. The customer can verify that the total of feed counts equals the total of delivery counts plus the number of manually cleared sheets. This is described with regards to FIG. 2 below.

Figure 2:
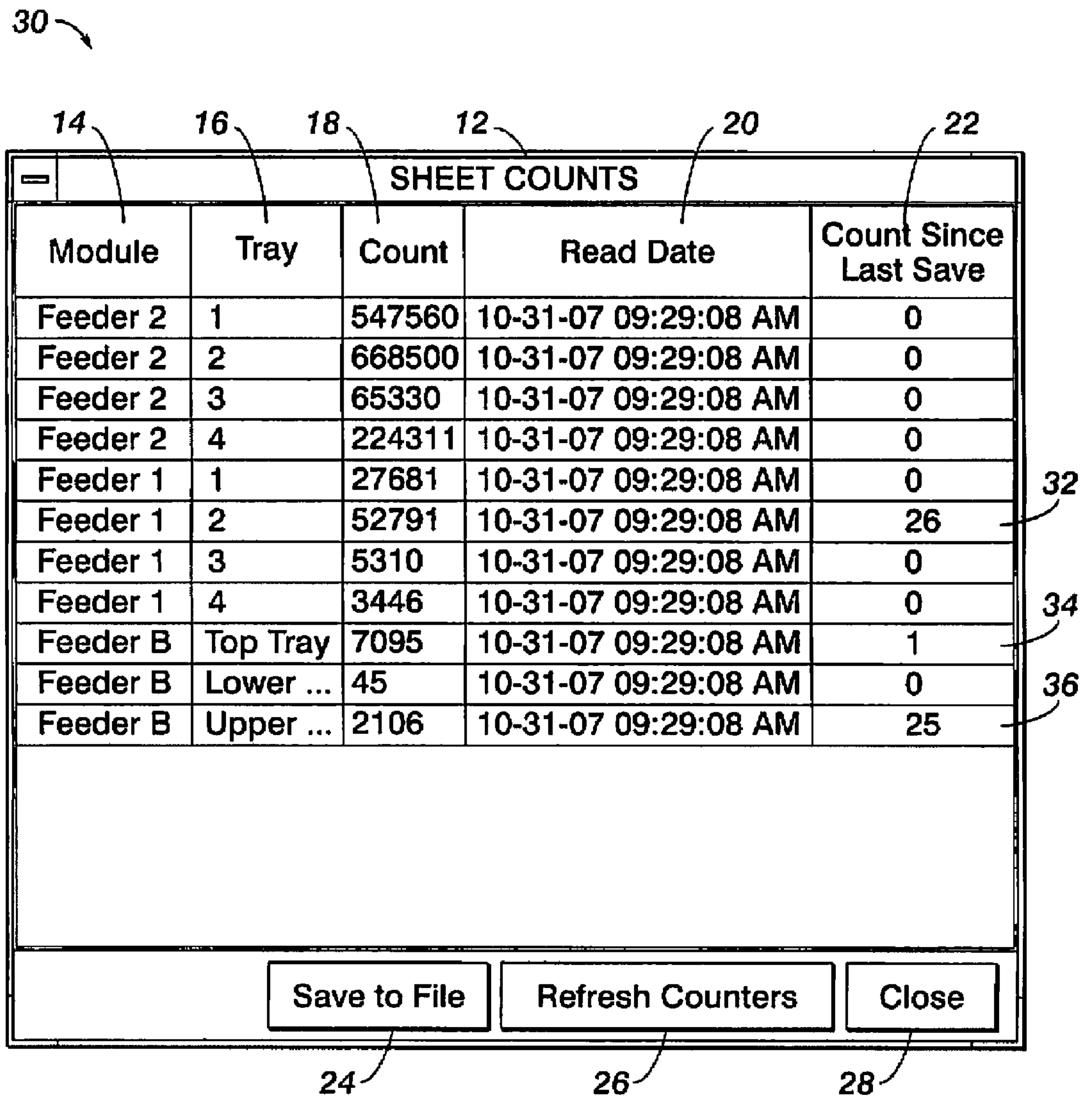
FIG. 2 illustrates a graphical user interface (GUI) depicting a sheet count in a secondary state with several system counts, in accordance with the exemplary embodiments of the present disclosure.

FIG. 2 illustrates GUI depicting a sheet count in a secondary state with several system counts, in accordance with the exemplary embodiments of the present disclosure. The GUI 10 includes a sheet counts file path 12, a printer module column 14, a printer tray column 16, a count column 18, a read data column 20, a count since last save column 22, a save to file button 24, a refresh counters button 26, and a close button 28, as illustrated in FIG. 1. In addition, FIG. 2 includes a feeder tray—tray 2 count 32, a finisher B—top tray count 34, and a finisher B—upper tray count 36.

FIG. 2 provides an example of how at the end of the print run, a second log file is saved and the counts for that job are calculated from the data in the two log files. The customer can verify that the total of feed counts equals the total of delivery counts plus the number of manually cleared sheets. As a result, a record for every feeder and finish point is created that contains the module name (printer module column 14), tray name (printer tray column 16), current count (count column 18), and counter read date (read data column 20). This may be an operator initiated request, but it could also be automated to occur at the beginning of each job. After the job has completed, the customer may refresh the counters to verify that the number of sheets fed matches the number of sheets sent to the finishing device, and may also verify that the numbers match through a manual count.

As a result of this process, each extensible markup language (XML) file produced can be used by auditors to automatically verify that every sheet of the secure stock is accounted for. This in-line solution improves productivity to the customer by not having the customer restart the MICR printer system for every job. Instead, the customer can use the XML file to link to his or her management information system (MIS) capability for further audit automation.

This solution also opens up other possible print engine data that can be displayed via a similar GUI plug-in. For instance, this process makes available to the customer a GUI plug-in on the digital front-ends (DFE) to display current counts for each feeder and finisher on the device. Before a job is run the current values can be saved to an XML file time stamped with the date the counters were read. The customer may then run their job to completion, and save the values to another XML again and/or display the results on the GUI.

Figure 3:
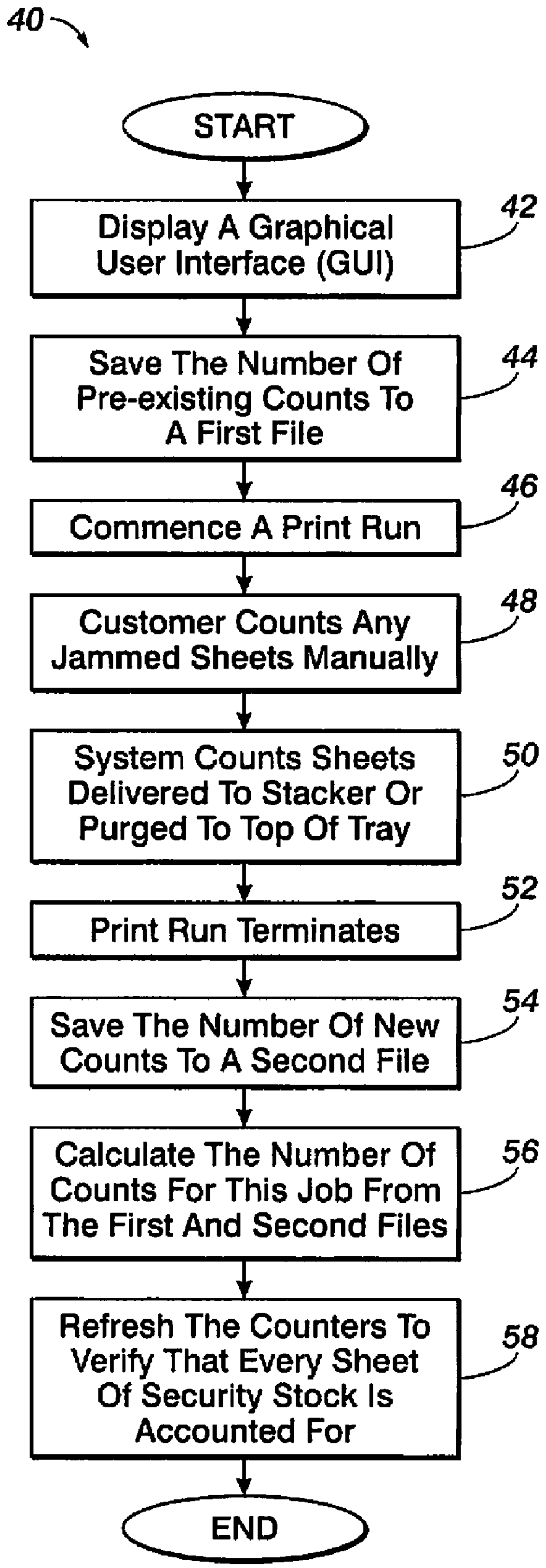
FIG. 3 illustrates a workflow diagram implementing the software described in FIGS. 1 and 2, in accordance with the exemplary embodiments of the present disclosure.

FIG. 3 illustrates a workflow diagram implementing the software described in FIGS. 1 and 2, in accordance with the exemplary embodiments of the present disclosure. The flowchart 40 includes the following steps. In step 42, a graphical user interface is displayed. In step, 44, the numbers of pre-existing counts of a first log file are saved. In step 46, a print run is commenced. In step 48, a customer manually counts any jammed sheets. In step 50, the MICR printer counts the number of sheets delivered to a stacker or purged to the top of the tray. In step 52, the print run terminates. In step 54, the number of new counts is saved to a second log file. In step 56, the numbers of counts for the current job are calculated from the first and second log files. In step 58, the counter may be refreshed to verify that every sheet of security stock is accounted for.

Consequently, the exemplary embodiments of the present disclosure present an in-line solution that improves productivity to the customer by not having the customer restart the MICR printer system for every job. Instead, the customer can use the XML file to link to his or her MIS capability for further audit automation. Furthermore, this solution also opens up other possible print engine data that can be displayed via a similar GUI plug-in. In addition, the operator can use this information obtained from the log files, along with manually-captured data on the number of sheets loaded in the trays and the number of sheets manually removed from the paper path during jam clearance, to account for the total number of sheets of the security stock that was used. As current mechanisms for extracting this information from the machine are cumbersome, this approach increases overall shop productivity.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or combinations thereof.

The invention claimed is:

1. A computer-implemented method for auditing security stock usage, the method comprising:

displaying, by a computing device, one or more data on a graphical user interface (GUI);

extracting, by said computing device, a first set of information into a first log file from the one or more data displayed on the GUI;

commencing a print run on a printer;

extracting, by said computing device, a second set of information into a second log file after the print run terminates;

determining, by said computing device, a number of sheets of security stock used from the first log file and the second log file; and the first set of information includes first values of the one or more data, the first values being current count numbers for a number of printer modules.

2. The computer-implemented method according to claim 1, wherein the auditing of the security stock is performed on magnetic ink character recognition (MICR) printers.

3. The computer-implemented method according to claim 1, wherein the one or more data includes a number of printer module names, a number of printer tray names, a current count number for each printer module name, and a time stamp designating a date that each of the first set of information was read.

4. The computer-implemented method according to claim 1, wherein the second set of information includes second values of the one or more data, the second values resulting from the termination of the print run.

5. The computer-implemented method according to claim 1, wherein during the print run a user counts a number of jammed sheets and the printer counts a number of sheets delivered to one or more output destinations.

6. The computer-implemented method according to claim 5, wherein a number of total counts is equal to the number of jammed sheets counted by the user and the number of sheets delivered to the one or more output destinations.

7. The computer-implemented method according to claim 1, wherein the determination of the number of sheets of security stock used further includes a number of sheets fed to a feeder, a number of sheets purged, a number of sheets sent to a finisher, and a number of sheets cleared through a jam clearance.

8. A system for auditing security stock usage, the system comprising:

a graphical user interface (GUI) for displaying one or more data;

a first log file including a first set of information extracted from the one or more data displayed on the GUI;

a printer for receiving a print run;

a second log file including a second set of information extracted from the one or more data displayed on the GUI after the print run terminates;

a tracking mechanism for determining a number of sheets of security stock used from the first log file and the second log file; and the first set of information includes first values of the one or more data, the first values being current count numbers for a number of printer modules.

9. The system according to claim 8, wherein the auditing of the security stock is performed on magnetic ink character recognition (MICR) printers.

10. The system according to claim 8, wherein the one or more data includes a number of printer module names, a number of printer tray names, a current count number for each printer module name, and a time stamp designating a date that each of the first set of information was read.

11. The system according to claim 8, wherein the second set of information includes second values of the one or more data, the second values resulting from the termination of the print run.

12. The system according to claim 8, wherein during the print run a user counts a number of jammed sheets and the printer counts a number of sheets delivered to one or more output destinations.

13. The system according to claim 12, wherein a number of total counts is equal to the number of jammed sheets counted by the user and the number of sheets delivered to the one or more output destinations.

14. The system according to claim 8, wherein the determination of the number of sheets of security stock used further includes a number of sheets fed to a feeder, a number of sheets purged, a number of sheets sent to a finisher, and a number of sheets cleared through a jam clearance.

15. A non-transitory computer program product for auditing security stock usage, the computer program product comprising:

a storage medium readable by a processing circuit and storing instructions for execution by the processing circuit for facilitating a method comprising:

displaying one or more data on a graphical user interface (GUI); extracting a first set of information into a first log file from the one or more data displayed on the GUI;

commencing a print run on a printer;

extracting a second set of information into a second log file after the print run terminates; and determining a number of sheets of security stock used from the first log file and the second log file.

16. The non-transitory computer program product according to claim 15, wherein the first set of information includes first values of the one or more data, the first values being current count numbers for a number of printer modules.

17. The non-transitory computer program product according to claim 15, wherein the second set of information includes second values of the one or more data, the second values resulting from the termination of the print run.

18. The non-transitory computer program product according to claim 15, wherein during the print run a user counts a number of jammed sheets and the printer counts a number of sheets delivered to one or more output destinations.

* * * * *